(12) United States Patent
Takemoto

(10) Patent No.: US 10,166,893 B2
(45) Date of Patent: Jan. 1, 2019

(54) SEAT PAD

(71) Applicant: TOYO TIRE & RUBBER CO., LTD., Itami-shi, Hyogo (JP)

(72) Inventor: Masahiko Takemoto, Itami (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 0 days.

(21) Appl. No.: 15/683,984

(22) Filed: Aug. 23, 2017

(65) Prior Publication Data

US 2018/0079338 A1 Mar. 22, 2018

(30) Foreign Application Priority Data

Sep. 21, 2016 (JP) .................. 2016-183879

(51) Int. Cl.
| | |
|---|---|
| *B60N 2/64* | (2006.01) |
| *A47C 7/02* | (2006.01) |
| *A47C 7/18* | (2006.01) |
| *B60N 2/70* | (2006.01) |
| *A47C 27/14* | (2006.01) |
| *A47C 27/15* | (2006.01) |

(52) U.S. Cl.
CPC .............. *B60N 2/64* (2013.01); *A47C 7/029* (2018.08); *A47C 7/18* (2013.01); *B60N 2/70* (2013.01); *A47C 27/148* (2013.01); *A47C 27/15* (2013.01)

(58) Field of Classification Search
CPC .. B60N 2/64; B60N 2/70; A47C 7/022; A47C 7/18; A47C 7/029
USPC ...................... 297/452.27, 452.48
See application file for complete search history.

(56) References Cited

U.S. PATENT DOCUMENTS

| | | | |
|---|---|---|---|
| 3,402,192 A | 9/1968 | Haluska | |
| 2008/0085945 A1 | 4/2008 | Sasaki et al. | |
| 2012/0313421 A1* | 12/2012 | Kondo | A47C 27/15 |
| | | | 297/452.48 |
| 2016/0023584 A1 | 1/2016 | Nakada | |
| 2016/0039322 A1* | 2/2016 | Nakada | B60N 2/646 |
| | | | 297/452.48 |
| 2016/0052435 A1* | 2/2016 | Nakada | B60N 2/646 |
| | | | 297/452.48 |

FOREIGN PATENT DOCUMENTS

JP 2016-22320 A 2/2016

OTHER PUBLICATIONS

Non-Final Office Action dated Sep. 26, 2018, issued in U.S. Appl. No. 15/683,986 (14 pages).

* cited by examiner

*Primary Examiner* — Anthony D Barfield
(74) *Attorney, Agent, or Firm* — Westerman, Hattori, Daniels & Adrian, LLP

(57) ABSTRACT

A seat pad is made of a flexible polyurethane foam, wherein when the seat pad is divided into five equal parts in a direction of a thickness and the five equal parts are termed from a first layer, to a fifth layer, starting from a front surface side, the equal parts are ranked in the following order of decreasing hardness: the fifth layer, the fourth layer, the third layer, and the second layer. The hardness of the fourth layer is set larger than the hardness of the first layer. A midportion of the seat pad that is a portion other than the front surface and an underside surface is set at a density of 45 to 55 kg/m³.

4 Claims, 2 Drawing Sheets

SEAT PAD

TECHNICAL FIELD

The present invention relates to seat pads and particularly relates to a seat pad capable of reducing a sense of wobble.

BACKGROUND ART

Flexible polyurethane foam-made seat pads used for seats mounted on vehicles and conveyances, such as boats, ships, and aircraft, furniture chairs, and the like may give users a sense of lateral wobble. For example, a seat pad may be deformed by vibrations in a low-frequency band (for example, about 1 Hz) input when a vehicle goes around a mild curve or makes a lane change, resulting in production of a sense of wobble, such as sideslip or lateral rocking about a roll axis. Such a sense of wobble is a factor affecting the steering stability. There is a technique for setting the hardness of a seat pad in order to reduce such a sense of wobble (Patent Literature 1).

CITATION LIST

Patent Literature

[Patent Literature 1] JP-A No. 2016-22320

SUMMARY OF INVENTION

Technical Problem

However, in relation to the above-described known technique, there is a demand for weight reduction of the seat pad from the viewpoint of improving fuel economy or other viewpoints.

The present invention has been made to respond to the above demand and has an object of providing a seat pad enabling weight reduction while reducing a sense of wobble.

Solution to Problem

To attain the above object, a seat pad according to the present invention is a seat pad made of a flexible polyurethane foam, wherein when the seat pad is divided into five equal parts in a direction of a thickness between a front surface and an underside surface and the five equal parts are termed a first layer, a second layer, a third layer, a fourth layer, and a fifth layer, starting from the front surface side, a midportion of the seat pad that is a portion other than the front surface and the underside surface is set at a density of 45 to 55 kg/m$^3$. The equal parts are ranked in the following order of decreasing hardness: the fifth layer, the fourth layer, the third layer, and the second layer, with the hardness of the fourth layer set larger than the hardness of the first layer. The hardness is 25% hardness measured in conformity to a D method defined in JIS K6400-2 (2012).

Advantageous Effects of Invention

By a seat pad according to a first aspect, the body of a sitting person is supported so as to be wrapped in the first layer, the second layer, the third layer, the fourth layer, and the fifth layer. Therefore, the seat pad has the effect of reducing a sense of wobble. Since the midportion of the seat pad that is a portion other than the front surface and the underside surface is set at a density of 45 to 55 kg/m3, the seat pad can be reduced in weight. Therefore, the seat pad can be reduced in weight while reducing the sense of wobble.

In the seat pad according a second aspect, the ratio of the hardness of the fifth layer to the hardness of the fourth layer is larger than the ratio of the hardness of the fourth layer to the hardness of the first layer, so that a supporting force derived from the fifth layer can be secured. Therefore, in addition to the effects of the first aspect, a sense of wobble and a sense of bottom touch can be reduced.

In the seat pad according to a third aspect, the second layer has a larger hardness than the first layer. Therefore, in addition to the effects of the first aspect, the softness when the body is pressed against the first layer and the holdability derived from the layers ranging from the second layer to the fifth layer can be improved.

In the seat pad according to a fourth aspect, the ratio of the hardness of the fifth layer to the hardness of the first layer is set at 1.2 or more. Therefore, in addition to the effects of the first aspect, the fifth layer can prevent the body of a sitting person from excessively sinking down.

In the seat pad according to a fifth aspect, a tensile modulus meaning the slope in an interval from a strain of 1.0 to a strain of 1.5 of a stress-strain curve determined by a tensile test conforming to the JIS K6400-5 (2012) is 150 kPa or less. Thus, the horizontal tensile stress on the front surface of the seat pad can be reduced, so that the angle of inclination of a sitting person's body to the vertical direction due to the input of vibrations can be reduced. Therefore, in addition to the effects of the first aspect, the seat pad can further reduce the sense of wobble that the sitting person feels.

DESCRIPTION OF EMBODIMENTS

Figure 1:
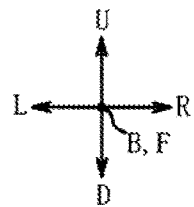
FIG. 1 is a cross-sectional view of a seat pad for which a flexible polyurethane foam according to one embodiment of the present invention is applied.
Figure 1:
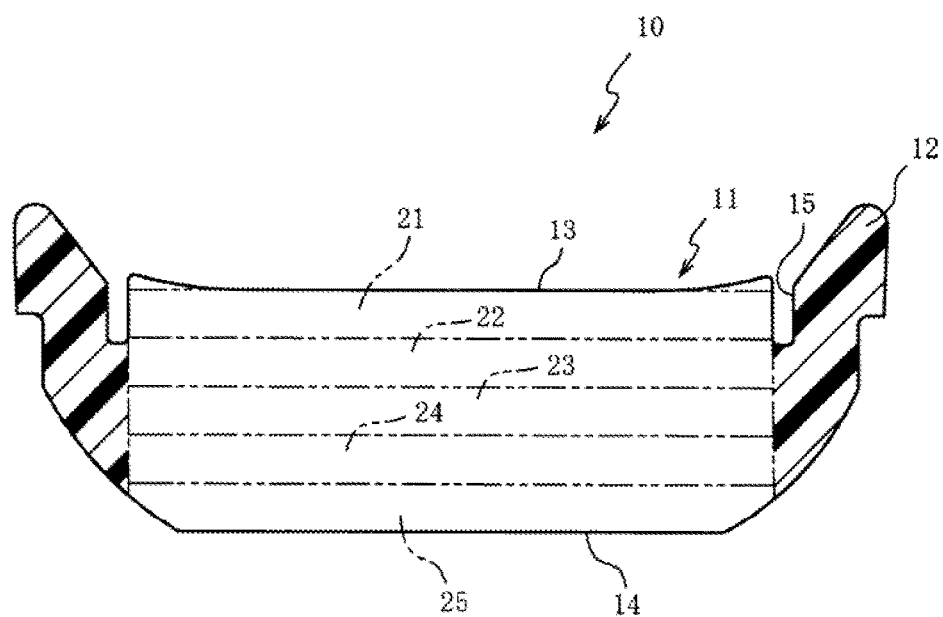

Hereinafter, a description will be given of a preferred embodiment of the present invention with reference to the accompanying drawings. FIG. 1 is a cross-sectional view of a seat pad 10 for which a flexible polyurethane foam according to one embodiment of the present invention is applied. In this embodiment, a description will be given of a seat pad 10 to be applied for a seat cushion for a motor vehicle. The arrows U-D, L-R, and F-B in FIG. 1 show the vertical direction, the left-to-right direction, and the front-to-rear direction, respectively, of a vehicle (not shown) on which the seat pad 10 is mounted. For ease of understanding, in FIG. 1, the hatching for a supporting portion 11 is omitted.

As shown in FIG. 1, the seat pad 10 is made of a flexible polyurethane foam and includes: a supporting portion 11 that supports the hip and the back side of the thigh of a sitting person; and side portions 12 disposed on both sides of the supporting portion 11 in the left-to-right direction (the direction of the arrow L-R). The supporting portion 11 has a front surface 13 against which the sitting person's body is pressed and an underside surface 14 opposite to the front surface 13.

The side portions 12 are portions that support the lateral sides of the thigh and hip of the sitting person. A pair of grooves 15 extending in the front-to-rear direction (the direction perpendicular to the plane of FIG. 1) are formed at the boundaries between the supporting portion 11 and the side portions 12. The grooves 15 are portions for use to secure a skin (not shown) made of fabric, artificial leather or leather to the seat pad 10 with the skin drawn taut between the grooves 15.

The seat pad 10 has the feature that its hardness (25% ILD) varies in the vertical direction of a vehicle, i.e., the thickness direction of the supporting portion 11. Test pieces for measuring the hardness are taken from the middle of each of layers of the supporting portion 11 obtained by dividing the supporting portion 11 into five equal parts in the thickness direction and termed a first layer 21, a second layer 22, a third layer 23, a fourth layer 24, and a fifth layer 25, starting from the front surface 13 side. The test pieces each have a square platy shape of 400 mm wide and long and the thickness of each test piece is obtained by dividing the thickness of the supporting portion 11 into five equal parts. The measurement of the hardness conforms to the JIS K6400-2 (2012) D method. JIS K6400-2 is a Japanese Industrial Standard established based on ISO 2439 (4th: published in 2008), ISO 3386-1 (2nd: published in 1986), and ISO 3386-2 (2nd: published in 1997).

The density of the seat pad 10 is set at 45 to 55 kg/m$^3$. A test piece for measuring the density is taken from a portion of the supporting portion 11 other than the front surface 13 and the underside surface 14, i.e., a midportion of the supporting portion 11. The midportion is a portion including all of any portion of the first layer 21 except the front surface 13, any portion of the fifth layer 25 except the underside surface 14, the second layer 22, the third layer 23, and the fourth layer 24. The reason why the front surface 13 and the underside surface 14 are excluded is that hard skins are excluded. The test piece is measured in terms of mass and volume, from which the density is calculated. By setting the density at 45 to 55 kg/cm$^3$, the seat pad 10 can be reduced in weight, without sacrificing comfort to reduce the thickness beyond necessity. As a result, compatibility can be achieved between weight reduction contributing to improvement in the fuel economy of the vehicle and securing of comfort.

Figure 2:
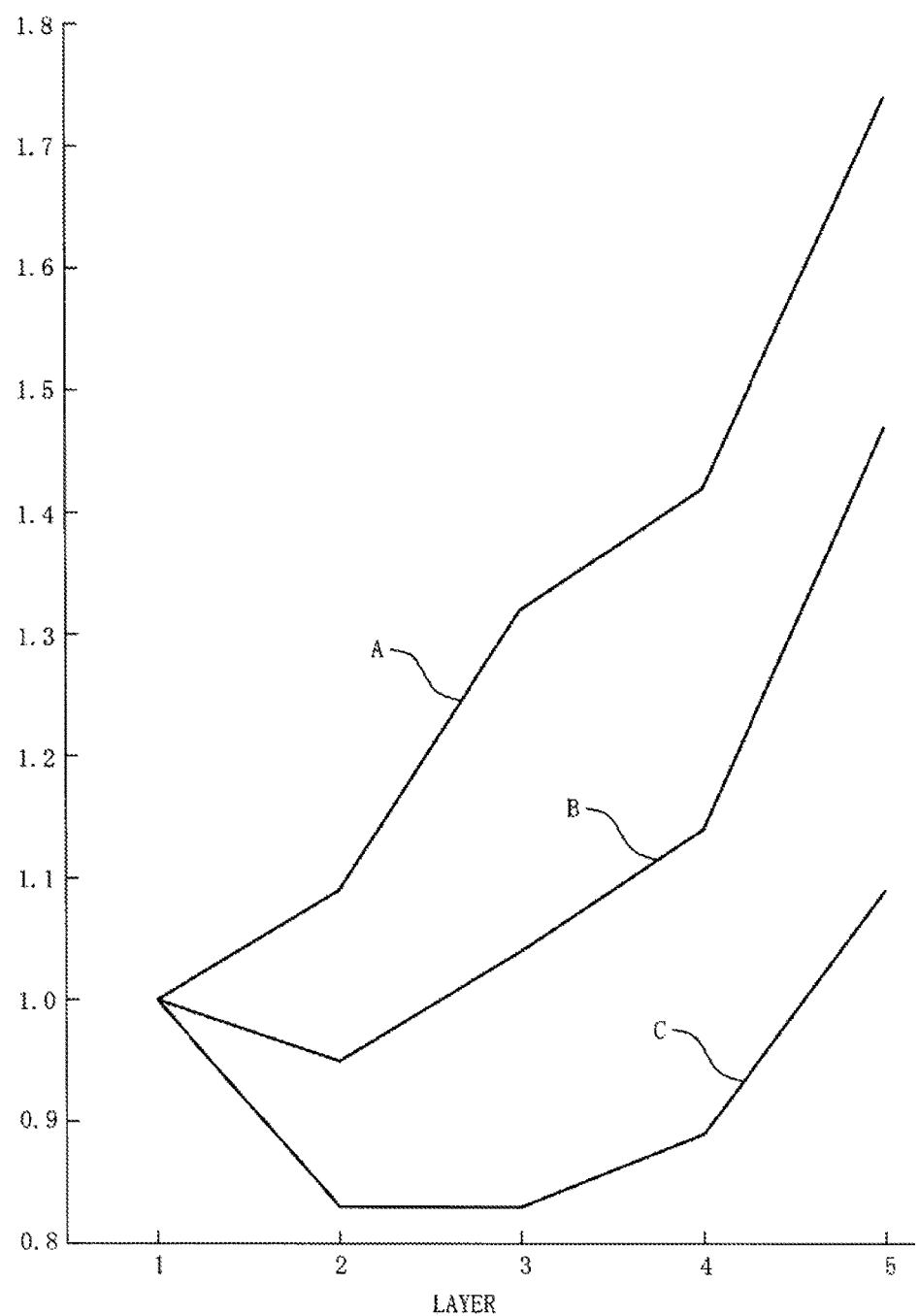
FIG. 2 is a graph showing hardness gradients from first to fifth layers.

FIG. 2 is a graph showing the hardnesses (25% ILD) of the first layer 21 to the fifth layer 25 of the seat pad 10. FIG. 2 is a diagram showing hardness gradients with respect to the hardness of the first layer 21. In FIGS. 2, A and B are curves showing representative hardness gradients of the seat pad 10 and C is a curve of a hardness gradient of a seat pad in a comparative example. The abscissa axis in FIG. 2 represents the layers of the supporting portion 11 and the ordinate axis represents the ratio of hardness of each layer when the hardness of the first layer 21 is set at 1.

In the seat pad 10 in A and B of FIG. 2, the layers are ranked in the order of the fifth layer 25, the fourth layer 24, the third layer 23, and the second layer 22, starting from the hardest. Thus, when a person sits on the seat pad 10, his/her body sinks down into the first layer 21, the second layer 22, the third layer 23, the fourth layer 24, and the fifth layer 25 and is supported so as to be wrapped in the first layer 21, the second layer 22, the third layer 23, the fourth layer 24, and the fifth layer 25. Furthermore, since the fourth layer 24 has a larger hardness than the first layer 21, the sinking of the hip and thigh can be reduced by the fourth layer 24 and the fifth layer 25. As a result, a sense of wobble can be reduced while a sense of bottom touch is reduced.

In contrast, in the seat pad in C of FIG. 2, the layers are ranked in the order of the third layer, the fourth layer, and the fifth layer, starting from the softest and the second and third layers are substantially identical in hardness. Furthermore, the fourth layer has a smaller hardness than the first layer. When a person sits on this seat pad, the first to fourth layers are largely compressed and they swing with respect to the fifth layer. Therefore, there arises a problem of ease of generation of a sense of wobble.

The seat pad 10 in A and B can solve the above problem. Furthermore, in the seat pad 10 shown in A and B, the ratio of the hardness of the fifth layer 25 to the hardness of the fourth layer 24 is larger than the ratio of the hardness of the fourth layer 24 to the hardness of the first layer 21. In other words, in FIG. 2, the slope of the line connecting the hardness of the fourth layer 24 and the hardness of the fifth layer 25 is larger than the slope of the line connecting the hardness of the first layer 21 and the hardness of the fourth layer 24. Thus, a supporting force derived from the fifth layer 25 can be secured, which is effective in reducing the sense of wobble and the sense of bottom touch.

In the seat pad 10 in A and B, the ratio of the hardness of the fifth layer 25 to the hardness of the first layer 21 is preferably set at 1.2 to 2.0. The reason for this is that the fifth layer 25 prevents the body of a sitting person from excessively sinking down and concurrently a sense of discomfort due to excessive hardening of the fifth layer 25 can be reduced.

In the seat pad 10 in A and B, the ratio of the hardness of the fourth layer 24 to the hardness of the first layer 21 is preferably set at 1.0 to 1.5. The reason for this is that a supporting force derived from the fourth layer 24 can be secured. In the seat pad 10 in A and B, the ratio of the hardness of the third layer 23 to the hardness of the first layer 21 is preferably set at 1.0 to 1.4. The reason for this is that a supporting force derived from the layers ranging from the third layer 23 to the fifth layer 25 can be secured. In the seat pad 10 in A and B, the ratio of the hardness of the third layer 23 to the hardness of the second layer 22 is preferably set at 1.05 to 1.33. The reason for this is also that a supporting force derived from the layers ranging from the third layer 23 to the fifth layer 25 can be secured.

Note that in the seat pad 10 in A the second layer 22 has a larger hardness than the first layer 21, while in the seat pad 10 in B the second layer 22 has a smaller hardness than the first layer 21. Since in the seat pad 10 in A the second layer 22 has a larger hardness than the first layer 21, the softness when the body is pressed against the first layer 21 and the holdability derived from the layers ranging from the second layer 22 to the fifth layer 25 can be improved over the seat pad 10 in B.

In the seat pad 10, the tensile modulus is preferably set at 150 kPa or less. The tensile modulus refers to the slope in an interval from a strain of 1.0 to a strain of 1.5 of a stress-strain curve determined by a tensile test conforming to the JIS K6400-5 (2012). A dumbbell-shaped test piece for the tensile test is taken from a portion of the supporting portion 11 other than the front surface 13 and the underside surface 14, i.e., a midportion of the supporting portion 11. The stress-strain curve is prepared by plotting the strain when a tensile force is applied to the test piece on the abscissa against the stress obtained by dividing the tensile force by the cross-sectional area of the test piece before the test on the ordinate. A stress σ[Strain1.5] at a strain of 1.5 and a stress σ[Strain1.0] at a strain of 1.0 are determined from the stress-strain curve and the value calculated from the calculation formula (σ[Strain1.5]−σ[Strain1.0])/0.5 is defined as a tensile modulus (unit: kPa). JIS K6400-5 is a Japanese Industrial Standard established based on ISO 1798 (4th: published in 2008) and ISO 8067 (2nd: published in 2008).

When the supporting portion 11 of the seat pad 10 supports a sitting person, a compressive stress in the vertical direction and a tensile stress in the horizontal direction act on the front surface 13 of the supporting portion 11 by the sitting person. When vibrations in a low-frequency band (for example, about 1 Hz) in the horizontal direction, as produced when a vehicle goes around a mild curve or makes a lane change, are input to the supporting portion 11, the direction and magnitude of the tensile stress change and the direction and magnitude of the resultant force combined with the compressive stress also change accordingly. When the tensile modulus of the supporting portion 11 is set at 150 kPa or less, the seat pad 10 can bring the direction (slope) of the resultant force close to the vertical direction. As a result, the angle of inclination of the sitting person's body to the vertical direction due to the input of vibrations can be reduced, so that the seat pad 10 can reduce the sense of wobble that the sitting person feels.

Note that in the seat pad 10 the tensile modulus is preferably set at not less than 40 kPa. The reason for this is that a force of reaction to a horizontal load input to the front surface 13 of the supporting portion 11 can be secured and the holdability can be secured.

Next, a description will be given of a method for producing a seat pad 10. The seat pad 10 is produced by mixing a polyurethane forming composition containing a polyol component, a foaming agent, a cross-linking agent, and a foam stabilizer with an isocyanate component, pouring the mixture liquid (foaming stock solution) into a molding tool (not shown), and foaming and curing the mixture liquid in the molding tool. A description will be given below of the polyurethane forming composition and the isocyanate component which are for use in producing a flexible polyurethane foam (a foam).

Examples of the polyol components include polyols, such as polyether polyols, polyester polyols, polycarbonate polyols, polyolefin polyols, and lactone-based polyols and a single polyol or a mixture of two or more of these polyols can be used. Preferred among them are polyether polyols from the viewpoint of low cost of raw materials and excellent water resistance.

The polyol component may be used in combination with a polymer polyol as necessary. An example of the polymer polyol is one obtained by graft copolymerization of a polyether polyol made of polyalkylene oxide with a polymer component, such as polyacrylonitrile or acrylonitrile-styrene copolymer.

The weight-average molecular weight of the polyol component is preferably 5000 to 10000. If the weight-average molecular weight is less than 5000, the resultant foam will lose flexibility, which is likely to deteriorate the physical properties and reduce the elastic performance. If the weight-average molecular weight is more than 10000, the hardness of the foam is likely to decrease.

Water is mainly used as the foaming agent. The molding may be performed using the foaming agent, as necessary, in combination with a low-boiling organic compound, such as a small amount of cylcopentane or normal pentane, isopentane or HFC-245fa, or by mixing and dissolving air, nitrogen gas, liquefied carbon dioxide or the like into the stock solution with a gas loading apparatus.

The amount of the water blended as the foaming agent is preferably 3 to 5 parts by mass relative to 100 parts by mass of the polyol component. The reason for this is that the moldability of a foam having a relatively low density of 45 to 55 kg/m$^3$ can be secured. As the amount of water relative to 100 parts by mass of the polyol component is smaller than 3 parts by mass, the resultant foam tends to have a higher density. As the amount of water relative to 100 parts by mass of the polyol component is larger than 5 parts by mass, cells become more likely to collapse, so that a foam tends to be more difficult to mold.

A polyvalent active hydrogen compound having a low molecular weight is used as the cross-linking agent. By means of the cross-linking agent, the elastic properties of the seat pad can be easily controlled. Examples of such cross-linking agents include polyalcohols, such as ethylene glycol, propylene glycol, 1,4-butane diol, trimethylol propane, and glycerin; compounds obtained by polymerizing ethylene oxide or propylene oxide with any of the above polyalcohols as an initiator; and alkanolamines, such as monoethanolamine, diethanolamine, triethanolamine, and N-methyldiethanolamine. These compounds may be used alone or as a mixture of two or more.

The amount of the cross-linking agent blended is preferably 0.3 to 1.5 parts by mass relative to 100 parts by mass of the polyol component. The reason for this is that a cross-linking structure is adequately formed to reduce the tensile modulus of the resultant foam and provide a hardness gradient in the thickness direction while securing the stability of cells during molding. As the amount of cross-linking agent relative to 100 parts by mass of the polyol component is smaller than 0.3 parts by mass, the stability of cells during molding tends to become lower. As the amount of cross-linking agent relative to 100 parts by mass of the polyol component is larger than 1.5 parts by mass, the tensile modulus of the resultant foam tends to become higher.

The foam stabilizer is a component that promotes and stabilizes the formation of bubbles. Examples of such foam stabilizers that can be used are organic silicon-based surfactants and anion surfactants, including fatty acid salts, sulfate ester salts, phosphate ester salts, and sulfonates. The foam stabilizer is preferably one having a weight-average molecular weight of 4000 to 6000. The reason for this is that homogeneous cells capable of withstanding the initial foam pressure during molding can be formed. As the weight-average molecular weight of the foam stabilizer is smaller than 4000, the strength of cells formed during molding tends to become lower. As the weight-average molecular weight of the foam stabilizer is larger than 6000, the size of cells tends to be more heterogeneous.

The amount of the foam stabilizer blended is preferably 0.05 to 0.1 parts by mass relative to 100 parts by mass of the polyol component. The reason for this is that the moldability and dimensional stability of the foam can be secured. As the amount of foam stabilizer relative to 100 parts by mass of the polyol component is smaller than 0.05 parts by mass, cells become more likely to collapse, so that a foam tends to be more difficult to mold. As the amount of foam stabilizer relative to 100 parts by mass of the polyol component is larger than 0.1 parts by mass, isolated cells become more likely to be excessively formed, so that the dimensional stability tends to become lower.

The polyurethane forming composition, as necessary, further contains a catalyst, a defoaming agent, a flame retardant, a plasticizer, an antioxidant, an ultraviolet ray absorber, a colorant, various fillers, an internal mold release agent, and/or other process aids.

Various kinds of urethanization catalysts known in the art can be used as the catalyst. Examples that can be cited include: reactive amines, such as triethylamine, tripropylamine, tributylamine, N-methylmorpholine, N-ethylmorpholine, dimethylbenzylamine, N,N,N',N'-tetramethylhexamethylenediamine, N,N,N',N',N"- pentamethyldiethylenetriamine, and bis-(2-dimethylaminoethyl) ether; their organic acid salts; metal carboxylates, such as potassium acetate and potassium octylate; and organic metal compounds, such as stannous octoate, dibutyltin dilaurate, and zinc naphthenate. Also preferred are active hydrogen group-containing amine catalysts, such as N,N-dimethylethanolamine and N,N-diethylethanolamine. The preferred amount of catalyst added is 0.01 to 10% by mass relative to the polyol component.

The defoaming agent is a component that, during reaction, breaks cells to promote the formation of interconnected cells. Examples of such defoaming agents that are used include aliphatic polyhydric alcohols, such as polyether polyol; paraffin; and polybutadiene. The preferred aliphatic polyhydric alcohols are those having a weight-average molecular weight of 4000 or less.

The amount of the defoaming agent blended is preferably 2 to 7 parts by mass relative to 100 parts by mass of the polyol component. The reason for this is that the formation of interconnected cells can be promoted to secure the dimensional stability of the foam. As the amount of defoaming agent relative to 100 parts by mass of the polyol component is smaller than 2 parts by mass, isolated cells become more likely to be excessively formed to more easily contract the foam after being molded, so that the dimensional stability of the foam tends to become lower. As the amount of defoaming agent relative to 100 parts by mass of the polyol component is smaller than 7 parts by mass, the breakage of cells tends to progress more to make the hardness of the foam smaller.

Examples of the isocyanate components that can be used include various kinds of known polyfunctional aliphatic, alicyclic, and aromatic isocyanates. Examples that can be cited include tolylene diisocyanate (TDI), diphenylmethane diisocyanate (MDI), dicyclohexylmethane diisocyanate, triphenyl diisocyanate, xylene diisocyanate, polymethylene polyphenylene polyisocyanate, hexamethylene diisocyanate, isophorone diisocyanate, ortho-toluidine diisocyanate, naphthylene diisocyanate, xylylene diisocyanate, and lysine diisocyanate and these compounds may be used alone or in combination of two or more.

Examples of MDI-based isocyanates represented by diphenylmethane diisocyanate include diphenylmethane diisocyanate (pure MDI), polyphenylene polymethylene polyisocyanate (polymeric MDI), their polymeric forms, their urethane-modified forms, their urea-modified forms, their allophanate-modified forms, their biuret-modified forms, their carbodiimide-modified forms, their uretonimine-modified forms, their uretdione-modified forms, their isocyanurate-modified forms, and mixtures of two or more of them.

Terminal isocyanate prepolymers can also be used as the isocyanate component. Terminal isocyanate prepolymers are obtained by previously reacting a polyol, such as a polyether polyol or a polyester polyol, with a polyisocyanate (such as a TDI-based isocyanate or an MDI-based isocyanate). The use of such a terminal isocyanate prepolymer is suitable because this enables the control of the viscosity of the mixture liquid (foaming stock solution), the primary structure of the polymer, and the compatibility.

In this embodiment, MDI-based isocyanates are preferably used as the isocyanate component because they can be molded in elastic foams having smaller rebound resilience than elastic foams of TDI-based isocyanates. In the case where a mixture of an MDI-based isocyanate and a TDI-based isocyanate is used, the mass ratio between MDI-based and TDI-based isocyanates is 100:0 to 75:25 and preferably 100:0 to 80:20. As the mass ratio of the TDI-based isocyanate in the isocyanate component is larger than 20/100, the sense of wobble of the resultant foam tends to become weaker. When the mass ratio of the TDI-based isocyanate is larger than 25/100, the tendency is significant.

The isocyanate index of the isocyanate component (the percentage of the equivalence ratio of isocyanate groups to active hydrogen groups) is set at, for example, 85 to 130. The isocyanate index is determined relative to all the active hydrogen groups in the other components, including the polyol component and the cross-linking agent.

EXAMPLES

The present invention will be described in further detail with reference to examples; however, the present invention should not be limited to these examples. The compounding ratio of raw materials (polyurethane forming composition and isocyanate) forming each of Samples 1 to 17 is shown in Table 1. The numerical values shown in Table 1 are represented in terms of unit mass (mass ratio). Each isocyanate was blended so that the isocyanate index reached 100.

TABLE 1

|  |  | 1 | 2 | 3 | 4 | 5 | 6 | 7 | 8 | 9 |
|---|---|---|---|---|---|---|---|---|---|---|
| Polyol | 1 | 70 | 70 | 70 | 70 | 70 | 70 | 70 | 70 |  |
|  | 2 |  |  |  |  |  |  |  |  | 70 |
|  | 3 | 30 | 30 | 30 | 30 | 30 | 30 | 30 | 30 | 30 |
| Cross-linking agent | 1 | 0.30 | 0.50 | 0.50 | 0.50 | 0.50 | 0.50 | 0.75 |  | 1.00 |
|  | 2 |  |  |  |  |  |  |  | 1.00 |  |
|  | 3 |  |  |  |  |  |  |  |  |  |
| Deforming agent | 1 | 5 | 5 | 5 | 5 | 2 | 4 | 5 | 5 |  |
|  | 2 |  |  |  |  |  |  |  |  | 2 |
| Foam Stabilizer | 1 | 1.00 | 1.00 | 1.00 | 1.00 |  |  | 1.00 |  | 1.00 |
|  | 2 |  |  |  |  | 2.00 | 2.00 |  |  |  |
|  | 3 | 0.10 | 0.10 | 0.10 | 0.10 |  |  | 0.10 | 0.10 | 0.10 |
|  | 4 |  |  |  |  |  |  |  |  |  |
| Catalyst | 1 | 0.47 | 0.47 | 0.47 | 0.47 | 0.47 | 0.47 | 0.47 | 0.47 | 0.47 |
|  | 2 | 0.04 | 0.04 | 0.04 | 0.04 | 0.04 | 0.04 | 0.04 | 0.04 | 0.04 |
| Foaming agent |  | 3.7 | 3.7 | 3.7 | 3.7 | 3.7 | 3.7 | 3.7 | 3.7 | 3.7 |
| Isocyanate | 1 | 61.07 | 61.81 | 61.81 | 61.81 | 61.44 | 61.69 | 62.73 | 64.99 | 63.97 |
|  | 2 |  |  |  |  |  |  |  |  |  |
| Density |  | 48.2 | 48.0 | 51.8 | 54.8 | 47.6 | 48.1 | 48.0 | 52.1 | 52.0 |
| 25% ILD |  | 277.2 | 283.7 | 315.8 | 351.5 | 286.2 | 235.3 | 282.3 | 374.6 | 371.4 |
| Deflection |  | 42.6 | 42.6 | 38.4 | 34.1 | 41.1 | 48.2 | 43.5 | 31.4 | 31.9 |
| Tensile stress |  | 99.3 | 108.2 | 109.2 | 119.2 | 107.8 | 105.0 | 96.4 | 131.4 | 119.5 |
| Hardness ratios |  | 1.09 | 1.01 | 1.01 | 1.02 | 1.11 | 1.04 | 1.01 | 1.05 | 0.95 |

TABLE 1-continued

|  |  | | | | | | | | |
|---|---|---|---|---|---|---|---|---|---|
| (Second layer/First layer) | | | | | | | | | |
| Hardness ratios | | 1.32 | 1.27 | 1.13 | 1.15 | 1.22 | 1.17 | 1.09 | 1.20 | 1.02 |
| (Third layer/First layer) | | | | | | | | | |
| Hardness ratios | | 1.42 | 1.40 | 1.22 | 1.24 | 1.28 | 1.26 | 1.21 | 1.33 | 1.09 |
| (Fourth layer/First layer) | | | | | | | | | |
| Hardness ratios | | 1.74 | 1.71 | 1.52 | 1.42 | 1.59 | 1.31 | 1.49 | 1.68 | 1.38 |
| (Fifth layer/First layer) | | | | | | | | | |
| Density | | ○ | ○ | ○ | ○ | ○ | ○ | ○ | ○ | ○ |
| Sense of wobble | | ○ | ○ | ○ | ○ | ○ | ○ | ○ | ○ | ○ |
| Moldability | | ○ | ○ | ○ | ○ | Δ | Δ | ○ | ○ | ○ |

|  |  | 10 | 11 | 12 | 13 | 14 | 15 | 16 | 17 |
|---|---|---|---|---|---|---|---|---|---|
| Polyol | 1 | | 70 | 80 | 80 | 80 | | | |
|  | 2 | 70 | | | | | 52 | 52 | 52 |
|  | 3 | 30 | 30 | 20 | 20 | 20 | 48 | 48 | 48 |
| Cross-linking agent | 1 | 1.00 | 0.75 | 1.50 | 0.75 | 0.75 | 1.00 | 1.00 | 1.00 |
|  | 2 | | | | | | | | |
|  | 3 | | | | | | 4.00 | 4.00 | 4.00 |
| Defoaming agent | 1 | 5 | 7 | 5 | | | | | |
|  | 2 | | | | | | | | |
| Foam Stabilizer | 1 | 1.00 | 1.00 | 1.00 | | | 0.90 | 0.90 | 0.90 |
|  | 2 | | | | 1.00 | 1.00 | | | |
|  | 3 | | | | | | | | |
|  | 4 | 0.10 | 0.10 | 0.05 | | | | | |
| Catalyst | 1 | 0.47 | 0.47 | 0.47 | 0.45 | 0.45 | 0.33 | 0.33 | 0.33 |
|  | 2 | 0.04 | 0.04 | 0.04 | 0.09 | 0.09 | 0.05 | 0.05 | 0.05 |
| Foaming agent | | 3.7 | 3.7 | 3.7 | 2.9 | 3.7 | 3.4 | 3.4 | 3.4 |
| Isocyanate | 1 | 64.47 | 62.50 | 65.65 | 50.85 | 62.50 | | | |
|  | 2 | | | | | | 45.69 | 45.69 | 45.69 |
| Density | | 51.6 | 50.1 | 48.0 | 58.2 | — | 47.4 | 50.0 | 52.0 |
| 25% ILD | | 287.3 | 305.2 | 249.4 | 285.5 | — | 288.7 | 320.2 | 345.2 |
| Deflection | | 43.6 | 43.4 | 49.2 | 44.5 | — | 42.0 | 38.0 | 35.2 |
| Tensile stress | | 96.5 | 108.2 | 93.3 | — | — | 175.0 | 175.2 | 177.3 |
| Hardness ratios | | 0.92 | 1.01 | 0.94 | — | — | 0.78 | 0.79 | 0.83 |
| (Second layer/First layer) | | | | | | | | | |
| Hardness ratios | | 0.99 | 1.07 | 1.00 | — | — | 0.77 | 0.78 | 0.83 |
| (Third layer/First layer) | | | | | | | | | |
| Hardness ratios | | 1.06 | 1.17 | 1.00 | — | — | 0.82 | 0.83 | 0.89 |
| (Fourth layer/First layer) | | | | | | | | | |
| Hardness ratios | | 1.34 | 1.47 | 1.42 | — | — | 1.10 | 1.06 | 1.09 |
| (Fifth layer/First layer) | | | | | | | | | |
| Density | | ○ | ○ | ○ | X | — | ○ | ○ | ○ |
| Sense of wobble | | ○ | ○ | ○ | — | — | X | X | X |
| Moldability | | ○ | ○ | ○ | ○ | X | ○ | ○ | ○ |

The components shown in Table 1 are as follows.

Polyol 1: polyether polyol EP828 (Mitsui Chemicals, Inc.), 6000 weight-average molecular weight;

Polyol 2: polyether polyol EL820 (Asahi Glass Co., Ltd.), 5000 weight-average molecular weight;

Polyol 3: polymer polyol POP3623 (Mitsui Chemicals, Inc.);

Cross-linking agent 1: diethanolamine;

Cross-linking agent 2: glycerin;

Cross-linking agent 3: EL980 (Asahi Glass Co., Ltd.);

Defoaming agent 1: polyether polyol EP505S (Mitsui Chemicals, Inc.), 3000 weight-average molecular weight;

Defoaming agent 2: polyether polyol FA159 (Sanyo Chemical Industries, Ltd.), 6000 weight-average molecular weight;

Foam stabilizer 1: L3625 (Momentive Performance Materials Inc.);

Foam stabilizer 2: B8736LF2 (Evonik Japan Co., Ltd);

Foam stabilizer 3: SF2936F (Dow Corning Toray Co., Ltd.), 4000-6000 weight-average molecular weight, —$OCH_3$ end group;

Foam stabilizer 4: SF2945 (Dow Corning Toray Co., Ltd.), 4000-6000 weight-average molecular weight, —OH end group;

Catalyst 1: TEDA-L33 (Tosoh Corporation);

Catalyst 2: Toyocat ET (Tosoh Corporation);

Isocyanate 1: polymeric MDI, a mixture of 2,4'-MDI and 4,4'-MDI; and

Isocyanate 2: TM20 (Mitsui Chemicals, Inc.).

The weight-average molecular weights of the polyols and foam stabilizers are values measured by GPC (gel permeation chromatography).

(Test Method)

Each set of components were compounded in the mass ratio shown in Table 1 in the usual manner and uniformly mixed to obtain a foaming stock solution and, then, a predetermined amount of the solution was poured into a molding tool (a lower portion thereof) having a predetermined shape. The lower portion of the molding tool was topped with an upper portion of the molding tool and the solution was foamed and cured in the molding tool. Thereafter, the resultant product was demolded. In this manner, Samples 1 to 17 made of flexible polyurethane foam having the shape of a square prism of approximately 400 mm on a side of the base and approximately 100 mm in thickness were obtained.

Each sample was measured in terms of density, 25% ILD, deflection, and tensile modulus. The results are shown in Table 1. Furthermore, each of layers obtained by dividing each sample into five equal parts in the thickness direction was determined in terms of 25% ILD (hardness) and the ratios of the hardnesses of the layers other than a first layer to the hardness of the first layer (hardness ratios) were calculated. The results are shown in Table 1.

The density was calculated by taking a cuboid test piece 100 mm long, 100 mm wide, and 50 mm high from a midportion of each sample, i.e., a portion thereof not containing the skins, and measuring the mass of the test piece (unit: kg/m$^3$).

The 25% ILD was measured after a test piece was subjected to preliminary compression in the following method conforming to the JIS K6400-2 (2012) D method. The test piece was the sample (of approximately 400 mm on a side and approximately 100 mm in thickness). The preliminary compression was performed according to the following manner. The test piece was put on a support plate with the center of the test piece aligned with the center of a pressing plate. The test piece was put on the support plate with the underside surface of the sample (the upper molding tool portion side) facing the support plate. The position of the pressing plate (a 200 mm diameter flat disc) when applying a force of 5N to the test piece was considered to be an initial position and the thickness of the test piece at that time was read to tenths of a millimeter. Thereafter, a pressure was applied to the test piece at a speed of 50 mm/min until 75% of the thickness of the test piece was reached and, then immediately, the pressing plate was moved back to the initial position at the same speed (thus far is the preliminary compression). After the preliminary compression, the test piece was allowed to stand for 20 seconds, pressed to 25% of the thickness thereof at a speed of 50 mm/min by the pressing plate, and held for 20 seconds and the force at that time was read as a hardness (25% ILD, unit: N/314 cm$^2$).

The deflection was measured after a test piece was subjected to preliminary compression in the following manner conforming to the JIS K6400-2 (2012) E method. The preliminary compression was performed in the same manner as the preliminary compression performed in measuring 25% ILD. After the preliminary compression, the test piece was allowed to stand for 60 seconds, a pressure was then applied to the test piece at a speed of 50 mm/min by the pressing plate until 75% of the thickness of the test piece was reached and, then immediately, the pressing plate was moved back to the initial position. During this operation, the deflection (unit: mm) when a load of 490 N was applied during application of the pressure was measured.

The tensile modulus was measured in the following manner conforming to the JIS K6400-5 (2012). A 15 mm thick test piece was taken from a midportion of the sample not to contain the skins, using a dumbbell-shaped punching tool. Two parallel marked lines were put on a parallel portion of the test piece at equal distances from the center line of the test piece and perpendicularly to the longitudinal direction so that the test piece does not deform. The distance between the marked lines was 40 mm. Clamps of a tensile tester were fitted on the test piece symmetrically so that a tensile force was uniformly applied to the cross section of the center of the test piece, the tensile test was conducted at a speed of 200 mm/min, and the tensile force and the distance between the marked lines were measured until the breakage of the test piece.

A stress-strain curve was prepared by plotting the strain obtained by dividing the distance obtained by subtracting the distance between the marked lines before the test from the distance between the marked lines when a tensile force was applied by the distance between the marked lines before the test on the abscissa against the stress obtained by dividing the tensile force by the cross-sectional area of the test piece before the test on the ordinate. A stress σ[Strain1.5] at a strain of 1.5 and a stress σ[Strain1.0] at a strain of 1.0 were determined from the stress-strain curve and the value calculated from the calculation formula (σ[Strain1.5]−σ[Strain1.0])/0.5 was defined as a tensile modulus (unit: kPa).

Test pieces for use in measuring the hardness ratios were taken by cutting out a foam having the shape of a square prism of approximately 100 mm on a side of the base and approximately 100 mm in thickness from the vertical and horizontal center of the sample and dividing the foam into five equal parts in the thickness direction (except for Samples 13 and 14). By dividing the foam into five equal parts in the thickness direction, five test pieces with 100 mm on a side of the base and approximately 20 mm in thickness were obtained. The five test pieces were termed a first layer, a second layer, a third layer, a fourth layer, and a fifth layer, starting from the foam front surface side (the lower molding tool portion side). Each of the layers was measured in terms of 25% ILD (hardness) and the ratios of the hardnesses of the layers other than the first layer to the hardness of the first layer (hardness ratios) were determined. The method for measuring 25% ILD (inclusive of preliminary compression) is as described previously and further explanation thereof will be accordingly omitted. The test piece with a skin on one side was measured in terms of hardness in a state where it was put on the support plate with its skin side facing the support plate.

(Evaluation)

Each sample was evaluated in terms of density, sense of wobble, and moldability. The results are shown in Table 1. In the evaluation on the density, samples having a density of 45 to 55 kg/m$^3$ were evaluated as "good (open circle)" and samples having a density of above 55 kg/m$^3$ were evaluated as "bad (cross)". The samples whose densities were evaluated as "good" were also evaluated in terms of the sense of wobble.

The sense of wobble was evaluated in such a manner that each sample (of approximately 400 mm on a side and approximately 100 mm in thickness) was placed on a chair with a wooden seat and a tester sat on the sample. The tester placed the sample with the underside surface of the sample (the upper molding tool portion side) facing the seat of the chair and sat on the front surface of the sample (the lower molding tool portion side). If, when the tester swayed the upper body from side to side, the posture tilted unless he/she held the posture with a force on the upper body, the sample used was evaluated as "bad (cross)". If, when the tester swayed the upper body from side to side, the posture was stable without a force on the upper body, the sample used was evaluated as "good (open circle)".

As for the moldability, samples having no apparent abnormalities and capable of being molded were evaluated as "good (open circle)", samples capable of being molded but partly heterogeneous were evaluated as "passed (triangle)", and samples having collapsed foams and thus made non-moldable were evaluated as "bad (cross)".

As shown in Table 1, Sample 13 had a density of above 55 kg/m$^3$. Sample 14 in which the amount of foaming agent blended was increased as compared to Sample 13 in order to reduce the density had a collapsed foam and thus became non-moldable. Furthermore, Samples 15 to 17 in which a tolylene diisocyanate (TDI)-based isocyanate was used were evaluated as good in moldability and density but evaluated as bad in sense of wobble.

Unlike the above, Samples 1 to 12 in which an isocyanate consisting primarily of diphenylmethane diisocyanate (MDI) was used were evaluated as good in density and sense of wobble. Particularly, Samples 1 to 4 and 7 to 12 containing Foam stabilizer 3 or Foam stabilizer 4 were evaluated as good in all of density, sense of wobble, and moldability.

On the other hand, Samples 5 and 6 containing neither Foam stabilizer 3 nor Foam stabilizer 4 were evaluated as good in density and sense of wobble but their moldability was slightly poor as compared to Samples 1 to 4 and 7 to 12. Furthermore, in Samples 1 to 12 in which an MDI-based isocyanate was used, their behaviors during compression represented by 25% ILD and deflection were comparable to those of Samples 15 to 17 in which a TDI-based isocyanate was used.

However, Samples 1 to 12 were significantly different from Samples 15 to 17 in, among all the behaviors during compression, the hardness ratios in the first to fifth layers obtained by dividing the sample into five equal parts in the thickness direction. Specifically, in Samples 1 to 12, the hardness decreased in the order of the fifth layer, the fourth layer, the third layer, and the second layer and the fourth layer had a larger hardness than the first layer (see A and B of FIG. 2). On the other hand, in Samples 15 to 17, the fourth layer had a smaller hardness than the first layer (see C of FIG. 2).

Furthermore, in Samples 1 to 12, the tensile modulus which is a behavior during tension could be held less than or equal to 150 kPa. The tensile moduli of Samples 1 to 12 were approximately 40% smaller than those of Samples 15 to 17.

It can be assumed that Samples 1 to 12 could be made different in tensile modulus and hardness ratios from Samples 15 to 17 by changing the proportion of the cross-linking agent blended and the type of isocyanate. Each of the polyurethane forming compositions as raw materials for Samples 1 to 12 contains a cross-linking agent in a proportion of 0.3 to 1.5 parts by mass relative to 100 parts by mass of the polyol component. This is lower than the proportion of cross-linking agent blended in Samples 15 to 17. As a result, a cross-linking structure can be adequately formed during reaction, so that the tensile modulus of the resultant foam can be reduced.

Furthermore, the isocyanate component and the polyol component contained in the foaming stock solution poured in the lower portion of the molding tool react with each other to produce a polyurethane resin. Likewise, the isocyanate component and the foaming agent react with each other to produce polyamine and carbon dioxide. The isocyanate component and polyamine react with each other to produce a polyurea resin. Since the cross-linking agent enables an adequate formation of a cross-linking structure, the hardness during foaming and curing of the resins can be reduced in the order of the fifth layer, the fourth layer, the third layer, and the second layer and the fourth layer can have a larger hardness than the first layer. Since a hardness gradient from the first to fifth layers is set as just described and the tensile modulus can be reduced, the sense of wobble can be reduced.

When, at the above proportion of the cross-linking agent, the proportion of the foaming agent is increased in order to obtain a foam having a density of 45 to 55 kg/m$^3$, cells (bubbles) may be likely to become unstable owing to an initial foam pressure upon volume expansion due to the reaction with the isocyanate component, so that the foam may form depressions. Since Samples 1 to 4 and 7 to 12 contain a foam stabilizer having a weight-average molecular weight of 4000 to 6000 in a proportion of 0.05 to 0.10 parts by mass relative to 100 parts by mass of the polyol component, cells that can withstand the initial foam pressure can be formed even if the proportion of the foaming agent is increased. Therefore, a foam enabling weight reduction while reducing a sense of wobble can be produced.

Since Samples 1 to 12 contain 2 to 7 parts by mass of defoaming agent relative to 100 parts by mass of polyol component, the defoaming agent can promote opening of the cells to form interconnected cells in the resultant foam. Therefore, the dimensional stability of the foam can be increased.

Since Samples 1 to 12 is formed by reaction and curing of a polyurethane forming composition and an isocyanate component consisting primarily of MDI, the rebound resilience of the foam can be reduced as compared to Samples 15 to 17 in which a tolylene diisocyanate (TDI)-based isocyanate component is used. Thus, the sense of wobble of the resultant foam can be further reduced.

Although the present invention has been described so far with reference to the embodiment, the present invention is not limited to the above embodiment and it can be easily inferred that various modifications and changes can be made without departing from the spirit of the present invention. For example, the shapes described in the above embodiment are merely illustrative and it is naturally possible to employ other shapes.

Although in the above embodiment the description has been given of the seat pad (cushion material) made of flexible polyurethane foam to be mounted on a vehicle (motor vehicle), the present invention is not necessarily limited to this. It is naturally possible to apply the flexible polyurethane foam to a cushion material or a back pad material to be mounted on vehicles (for example, railway vehicles) other than motor vehicles, ships, boats, aircraft, or other conveyances or to a cushion material or a mat material for furniture or the like.

The invention claimed is:

1. A seat pad made of a flexible polyurethane foam, wherein
    when the seat pad is divided into five equal parts in a direction of a thickness between a front surface and an underside surface and the five equal parts are termed a first layer, a second layer, a third layer, a fourth layer, and a fifth layer, starting from the front surface side, a midportion of the seat pad that is a portion other than the front surface and the underside surface is set at a density of 45 to 55 kg/m$^3$,
    the equal parts are ranked in the following order of decreasing hardness at the center of each layer: the fifth layer, the fourth layer, the third layer, and the second layer, with the hardness of the fourth layer set larger than the hardness of the first layer, and a ratio of the hardness of the fifth layer to the hardness of the first layer is set at 1.2 or more, and
    the hardness is 25% hardness measured in conformity to a D method defined in JIS K6400-2 as used in the 2012 edition.

2. The seat pad according to claim 1, wherein a ratio of the hardness of the fifth layer to the hardness of the fourth layer is larger than a ratio of the hardness of the fourth layer to the hardness of the first layer.

3. The seat pad according to claim 1, wherein the second layer has a larger hardness than the first layer.

4. The seat pad according to claim 1, wherein a tensile modulus meaning a slope in an interval from a strain of 1.0 to a strain of 1.5 of a stress-strain curve determined by a tensile test conforming to the JIS K6400-5 (2012) is 150 kPa or less.

* * * * *